United States Patent
London et al.

(10) Patent No.: US 9,900,203 B1
(45) Date of Patent: Feb. 20, 2018

(54) SYSTEM AND METHOD FOR GENERATING HIGH POWER PULSES

(71) Applicant: BAE SYSTEMS Information and Electronic Systems Integration Inc., Nashua, NH (US)

(72) Inventors: Simon Y. London, Rockville, MD (US); Alexander B. Kozyrev, Rockville, MD (US); Stuart E. Clark, Springfield, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/407,054

(22) Filed: Jan. 16, 2017

(51) Int. Cl.
  *H04L 27/36* (2006.01)
  *H04B 3/50* (2006.01)

(52) U.S. Cl.
  CPC .............. *H04L 27/36* (2013.01); *H04B 3/50* (2013.01)

(58) Field of Classification Search
  CPC ....... H04L 27/36; H04L 27/364; H04L 27/00; H04L 27/34; H04B 3/50
  USPC ......................................... 375/295, 296, 271
  See application file for complete search history.

(56) References Cited

U.S. PATENT DOCUMENTS

| | | | | |
|---|---|---|---|---|
| 4,888,556 A | * | 12/1989 | Buttram | H05H 9/00 315/505 |
| 5,034,903 A | * | 7/1991 | Alfano | G01N 23/2254 250/311 |
| 7,498,978 B2 | | 3/2009 | Seddon et al. | |
| 8,744,004 B2 | * | 6/2014 | London | H03K 5/12 375/238 |
| 9,595,623 B1 | * | 3/2017 | Xie | H01L 31/022466 |
| 2012/0098607 A1 | * | 4/2012 | Tatoian | F41H 13/0068 331/96 |
| 2015/0221688 A1 | * | 8/2015 | Xu | H01L 27/14692 257/292 |

\* cited by examiner

*Primary Examiner* — Siu Lee
(74) *Attorney, Agent, or Firm* — Sand & Sebolt, LPA; Scott J. Asmus

(57) ABSTRACT

A system and method for generating high power pulses including a photoconductive semiconductor switch (PCSS), a laser for triggering the PCSS and a bipolar pulse generator coupled to the PCSS. The bipolar pulse generator is activated when the PCSS is triggered. A bipolar pulse is generated by the activated bipolar pulse generator. A modulator unit modulates the bipolar pulse to create a modulated bipolar pulse. The modulator unit is a nonlinear transmission line (NLTL).

18 Claims, 6 Drawing Sheets

SYSTEM AND METHOD FOR GENERATING HIGH POWER PULSES

BACKGROUND

Technical Field

The present disclosure relates generally to the field of generating radio frequency (RF) and/or microwave signals. More particularly, the present disclosure relates to generating high power RF pulses and/or high power microwave pulses. Specifically, the present disclosure relates to generating high power RF and/or microwave pulses based at least partially on utilizing a bipolar signal driver, utilizing optically-activated switches and specifying specific pulse profiles.

Background Information

Generally, high power RF and/or microwave pulse generators based on non-linear transmission lines (NLTLs) typically use high voltage unipolar pulses as pump pulse generators (e.g. video or rectangular pulse generators). Typically, these types of systems utilize a high voltage Blumlein generator as the video pulse generator where the Blumlein generator is typically activated by spark gap switches or thyratrons. A resulting output pulse of the system consists of an RF or microwave damped sinusoid with a direct current (DC) component and very low frequency components of the original video pulse. Although these types of systems are generally well known, there are some shortcomings associated with these types of systems as further described below.

For example, the energy stored in the DC component and very low frequency components of the resulting output pulse of the system cannot be used (i.e. cannot be radiated). Since the portion of energy stored in these components substantially exceeds the energy stored in the RF or microwave components the radiating efficiency of the system is very low.

Another shortcoming of the above-mentioned system is that the system utilizes high voltage technology (e.g. high voltage Blumlein generator) which requires implementation of safety requirements and procedures (e.g. the Blumlein generator must be utilized within a controlled working environment). Further, systems that utilize a Blumlein generator are typically heavy in weight which hinders practical application of the systems. Still further, the pulse repetition rate is limited by thermal and cooling issues as well as the charge rate available into the high voltage video pulse generator.

Another shortcoming of the above-mentioned system relates to the use of spark gap switches, which can be used to rapidly switch high voltages and very high currents for certain pulsed power applications, to trigger the Blumlein generator. One disadvantage of using spark gap switches is that spark gap switches require periodic maintenance and replacement. Another disadvantage is that high voltage Blumlein generators that utilize spark gap switches cannot be recharged in a short period of time (e.g. within a subnanosecond range). This limits the maximal repetition rate and the output energy of the system. Further, spark gap discharge is a statistical process which introduces a jitter into the system. Due to the jitter, only one spark gap switch can be used in a video pulse generator. In other words, jitter, amongst other things, limits the number of devices which can be synchronized for coherent output power which typically limits the output RF and/or microwave power of the system.

Therefore, there is a need for an improved system and method for generating high power RF and/or microwave pulses.

SUMMARY

Inasmuch as current high power RF and/or microwave pulse generators based on non-linear transmission line (NLTL) systems and methods are insufficient in some cases, an improved system and method for generating high power RF and/or microwave pulses is, therefore, needed. The present disclosure addresses these and other issues by establishing a system and method for generating high power RF and/or microwave pulses.

In one aspect, the disclosure may provide system for generating bipolar pulses, the system comprising: a photoconductive semiconductor switch (PCSS), a laser for triggering the PCSS and a bipolar pulse generator coupled to the PCSS, wherein the bipolar pulse generator is activated when the PCSS is triggered. A bipolar pulse is generated by the activated bipolar pulse generator and a modulator unit modulates the bipolar pulse to create a modulated bipolar pulse, wherein the modulator unit is a nonlinear transmission line (NLTL).

In another aspect, the above-mentioned system may be combined with a plurality of identical systems, wherein the plurality of identical systems are arranged in an array. The plurality of identical systems in the array are synchronized to increase direct current (DC) to radio frequency (RF) conversion efficiency.

In another aspect, the disclosure may provide a method for generating high power pulses comprising: triggering at least one photoconductive semiconductor switch (PCSS) with a laser, activating at least one bipolar pulse generator when the at least one PCSS is triggered and generating at least one bipolar pulse by the at least one activated bipolar pulse generator. The method modulates the at least one bipolar pulse with at least one modulator unit with an oscillating pulse, wherein the at least one modulator unit is a nonlinear transmission line (NLTL).

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
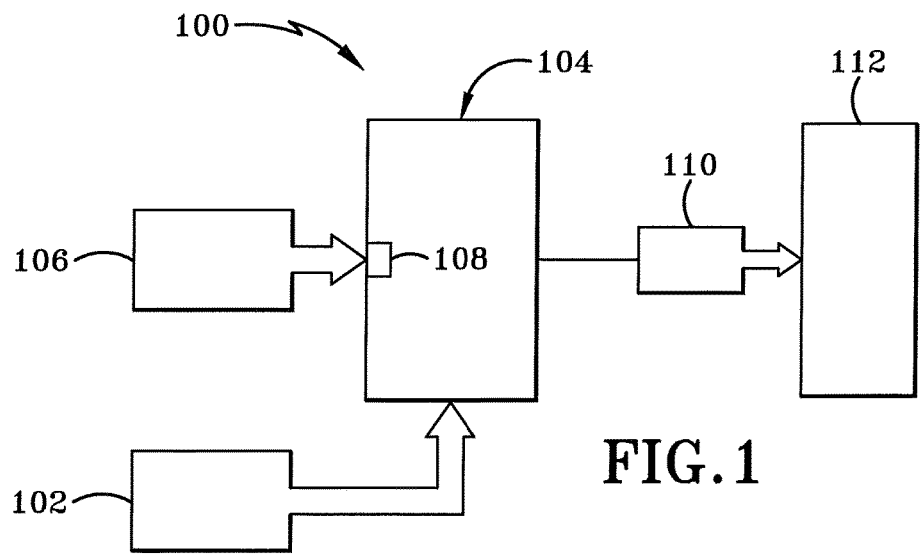
FIG. 1 is a diagrammatic top view of a system for generating high power pulses in accordance with the present disclosure.

As depicted in FIG. 1, a system for generating high power RF and/or microwave pulses is broadly depicted as 100. System 100 may include a power supply 102, at least one high power pulse generator 104, a laser 106, at least one optically activated photoconductive semiconductor switch (PCSS) 108, at least one modulator unit 110 and at least one antenna 112.

With continued reference to FIG. 1, power supply 102 includes an output which is electrically connected to the at least one high power pulse generator 104 through an input of the high power pulse generator 104. The at least one high power pulse generator 104 includes at least one input and at least one output. The high power pulse generator 104 is electrically coupled to the at least one PCSS 108. The at least one PCSS 108 is positioned to receive a pulse from the laser 106. The at least one modulator unit 110 includes at least one input and at least one output. The at least one modulator unit 110 is electrically connected to the at least one high power pulse generator 104 through the input of the modulator unit 104 and the output of the high power pulse generator 104. The at least one antenna 112 includes at least one input and at least one output. The modulator unit 110 is electrically connected to the antenna 112 through the output of the modulator unit 104 and the input of the antenna 112.

In one embodiment according to the present disclosure, the power supply 102 charges the at least one high power pulse generator 104. The power supply 102 may be a generator including an adjustable output voltage between approximately 500V-10 kV for each charged capacitive channel in the system 100. The power supply 102 may include a load capacitance between approximately 2 nF-60 nF. The load capacitance per charged capacitive channel may be between approximately 0.5 nf-15 nF. The capacitors may be positioned in close proximity to each other and may be externally discharged immediately after being charged. The repetition rate of the power supply 102 may be in the range from approximately single shot up to 500 kHz. The power supply 102 may include output protection for short and/or open circuit loads. In the event a short and/or open circuit load occurs, any surviving channels may remain functional with back electromagnetic interference (EMI). The ambient temperature of the power supply 102 may be between approximately 10 to 30° C. The operating temperature of the power supply 102 may be between approximately −20 to 50° C.

In one embodiment according to the present disclosure, the high power pulse generator 104 serves as a driver for the at least one modulator unit 110. The at least one modulator unit 110 may include at least one NLTL. The PCSS 108 is triggered by the laser 106. When the PCSS 108 is triggered, the high power pulse generator 104 is activated by the PCSS 108.

In one embodiment according to the present disclosure, the at least one high power pulse generator 104 may be a bipolar single/multi-cycle generator. The high power pulse generator 104 may generate high power RF pulses and/or high power microwave pulses. The high power pulse generator 104 generates a bipolar signal or two or more cycles of bipolar signals (e.g. waveforms). These bipolar signal(s) may be similar to the bipolar signal(s) 402, 404, 406 of FIG. 4A. As one of ordinary skill in the art would understand, the bipolar signal(s) may be any suitable bipolar signal including, but not limited to, symmetrical and asymmetrical bipolar signal(s). The rise and fall times of the bipolar signal(s) may be between approximately 100 pico seconds and several nanoseconds.

In one embodiment according to the present disclosure, the at least one modulator unit 110 may modulate the bipolar pulses with oscillating pulses to generate a modulated bipolar signal(s) with oscillating pulses. The modulated bipolar signal(s) may be similar to one or more of the modulated signal(s) 408, 410, 412 of FIG. 4. The frequency spectrum of the modulated bipolar signal(s) contains very little or does not contain a DC component. The output power of the at least one modulator unit 110 is routed to the at least one antenna 12. In accordance with none aspect of the present disclosure, the output of the at least one antenna 12 may be configured to radiate the (RF) and/or microwave signals.

In accordance with one embodiment of the present disclosure, the PCSS 108 may be a silicon PiN photodiode operating in linear mode or any other suitable PCSS 108 as one of ordinary skill in the art would understand. The PCSS 108 may be designed to operate consistently at ≥6.5 kV when integrated into the system 100. In one embodiment according to the present disclosure, the recovery time of the PCSS sets an upper limit on repetition rate at approximately 3 kHz.

Triggering the at least one high power pulse generator 104 by the at least one PCSS 108 allows synchronization of a number of NLTL devices. In other words, the system 100 is capable of unlimited phased array scaling. In contrast, triggering the at least one high power pulse generator 104 with a spark gap switch limits the amount of NLTL devices that can be synchronized based on the voltage that the spark gap switch can handle. If the spark gap switch is triggering multiple NLTL devices, the power of the spark gap switch is divided between the multiple NLTL devices.

Figure 2:
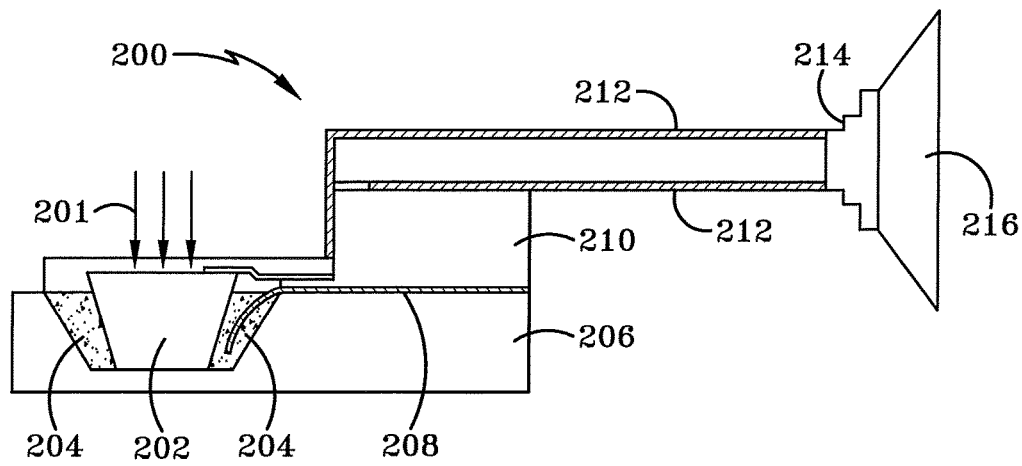
FIG. 2 is a diagrammatic side elevation view of a system for generating high power pulses in accordance with the present disclosure.

In accordance with one embodiment of the present disclosure, and as depicted in FIG. 2, a system for generating high power RF and/or microwave pulses is broadly depicted as 200. System 200 may include a laser 201, a photoconductive switch driver 202, potting material 204, a cradle 206, a thin-film transmission line 208, an active transformer 210, an NLTL 212, a passive transformer 214 and an antenna 216.

With continued reference to FIG. 2, the cradle 206 is configured to receive the photoconductive switch driver 202 and the potting material 204. The photoconductive switch driver 202 is secured within the cradle 206 by the potting material 204. The thin-film transmission line 208 is disposed between the cradle 206 and the active transformer 210. The thin-film transmission line 208 and the active transformer are coupled with the photoconductive switch driver 202. The NLTL 212 is coupled with the active transformer 210 and the passive transformer 214. The passive transformer 214 is coupled to the NLTL 212 and the antenna 216.

The laser 201, which may be any suitable laser having an appropriate wavelength as one of ordinary skill in the art would understand, activates the photoconductive switch driver 202 to generate a bipolar signal(s). The photoconductive switch driver 202 provides the necessary speed, voltage blocking, and high current density handling capability required to provide a compact scalable system 200. Utilizing a bipolar driver in place of a unipolar driver enhances the gyromagnetic precession which further increases DC to RF conversion efficiency. In one embodiment according to the present disclosure, the photoconductive switch driver 202 may be a silicon PiN photodiode operating in linear mode or any other suitable photoconductive switch driver 202 as one of ordinary skill in the art would understand. A PiN photodiode is a diode with a wide, undoped intrinsic semiconductor region between a p-type semiconductor and an n-type semiconductor region. The p-type and n-type regions are typically heavily doped because they are used for ohmic contacts.

The photoconductive switch driver 202 may be designed to operate consistently at ≥6.5 kV when integrated into the system 200.

The potting material 204 may be any suitable material as one of ordinary skill in the art would understand. The transmission line 208 and the active transformer 210 incorporate a geometry that efficiently couples the low impedance at the source to the input impedance of the NLTL 212. The transmission line 208 and active transformer 210 may be made of thin-film dielectric material or any other suitable material as one of ordinary skill in the art would understand. The transmission line 208 and active transformer 210, in conjunction with the photoconductive switch driver 202, transform DC stored energy to RF power at a frequency chosen by the physical dimensions of the system 200. The passive transformer 214 may be used to match the output impedance with the input impedance of the NLTL 212 before the modulated bipolar signal(s) is transmitted to the antenna 216.

The mechanism of RF modulation in the NLTL 212 is based on both the nonlinearity and dispersion of the material used. In one embodiment according to the present disclosure, the NLTLs may be selected from a particular class of NLTLs as described in U.S. patent application Ser. No. 10/469,963 (the '963 Application) filed on Oct. 30, 2003, the entirety of which is fully incorporated herein as if fully re-written. In one embodiment according to the present invention, the NLTL may be a coaxial NLTL including ferrite or yttrium-iron-garnet (YIG). The modulation results from the synchronous excitation of RF waves by an electromagnetic shockwave front. The system 200 benefits from the temporal dispersion resulting from the coherent magnetization reversal of a nonlinear magnetic material exhibiting strong gyromagnetic precession.

NLTL 212 experimental conditions correspond to the macrospin approximation in which all individual electron spins behave as a combined system. Such NLTL 212 gyromagnetic oscillators may be implemented in arrangements where nonlinear magnetic material is placed between two electrical conductors mechanically compatible with the photoconductive switch driver 202 design. The magnetic material must be initially magnetized to saturation by an external axial magnetic field. The pulsed current produces a component of magnetic field, $H_\theta$, which forces the magnetization vector to rotate. A sufficiently short rise time to the pumping pulse causes the magnetization vector in the magnetic material to gyromagnetically precess. The precessing field component couples with the field of the pumping impulse to modulate the amplitude of the input impulse. The operating frequency range of the system 200 may be from approximately 1 GHz up to 11 GHz.

In accordance with one embodiment of the present disclosure, the pulse's profile (e.g. pulse length, pulse rise time, frequency, voltage/current magnitude, etc.) is important. For example, the length of each pulse should be less than the relaxation time of the gyromagnetic precession. The pulse should have a fast transition from one polarity to another polarity (e.g. transition from a positive polarity to a negative polarity or transition from a negative polarity to a positive polarity). Further, the frequency of the bipolar pulse should be in a specific relation to the frequency of the gyromagnetic precession.

This provides greater efficiency of excitation of gyromagnetic oscillation when there is 180 degree variation of the pulsed field due to improved coupling of the pulsed magnetic field with gyromagnetic precession. This further provides parametric amplification oscillation by periodic variation of the polarity of the pulsed magnetic field. This further allows the system 200 to generate long RF pulses with approximately equal amplitude where the length of the pulse is limited by cooling requirements of the system 200. This is in contrast to a damped sinusoid of fixed length produced by a conventional unipolar pulse driven NLTL modulator.

Figure 4A:
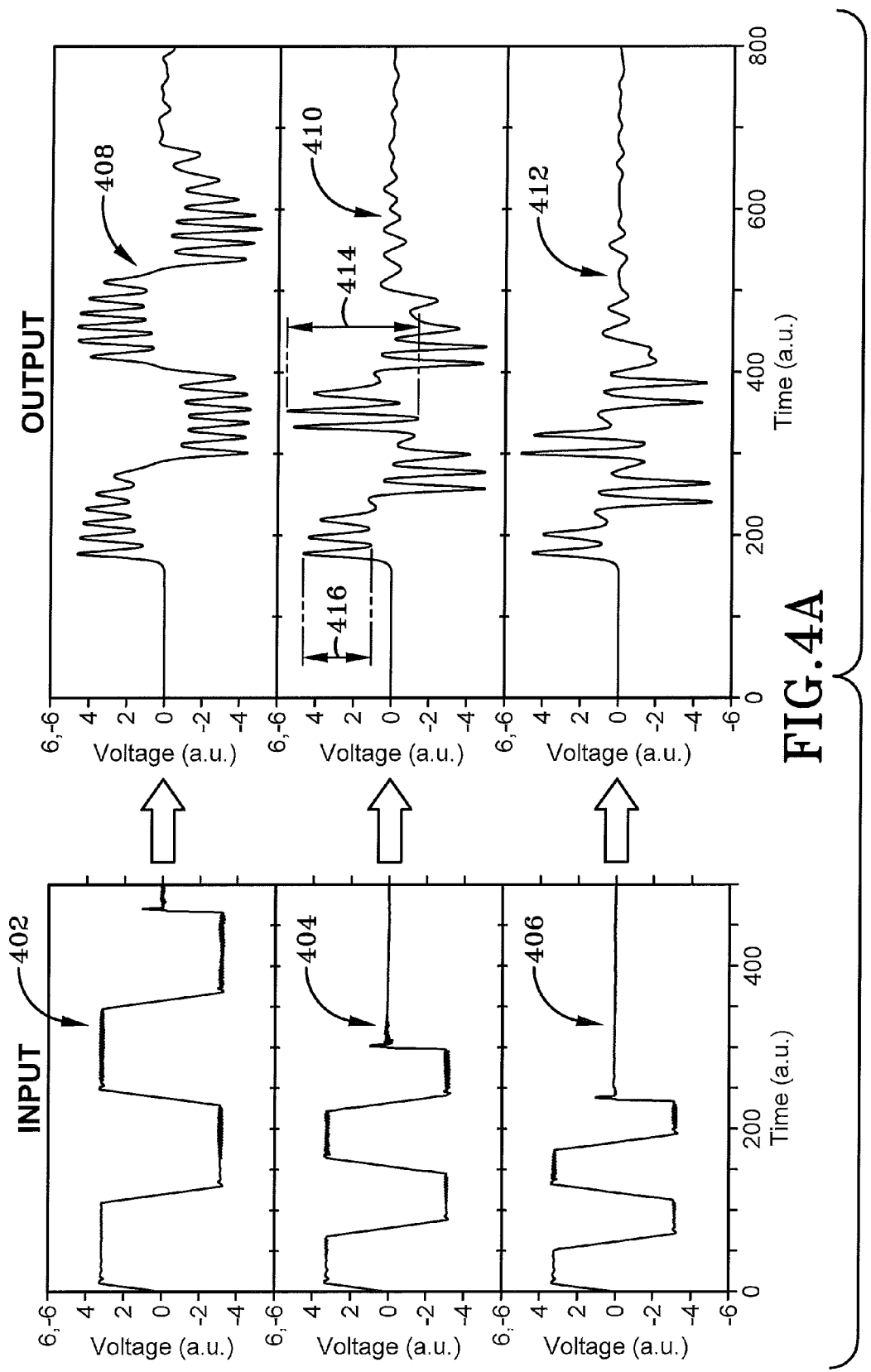
FIG. 4A are graphs representing input bipolar waveforms and output modulated waveforms in accordance with the present disclosure.
Figure 4B:
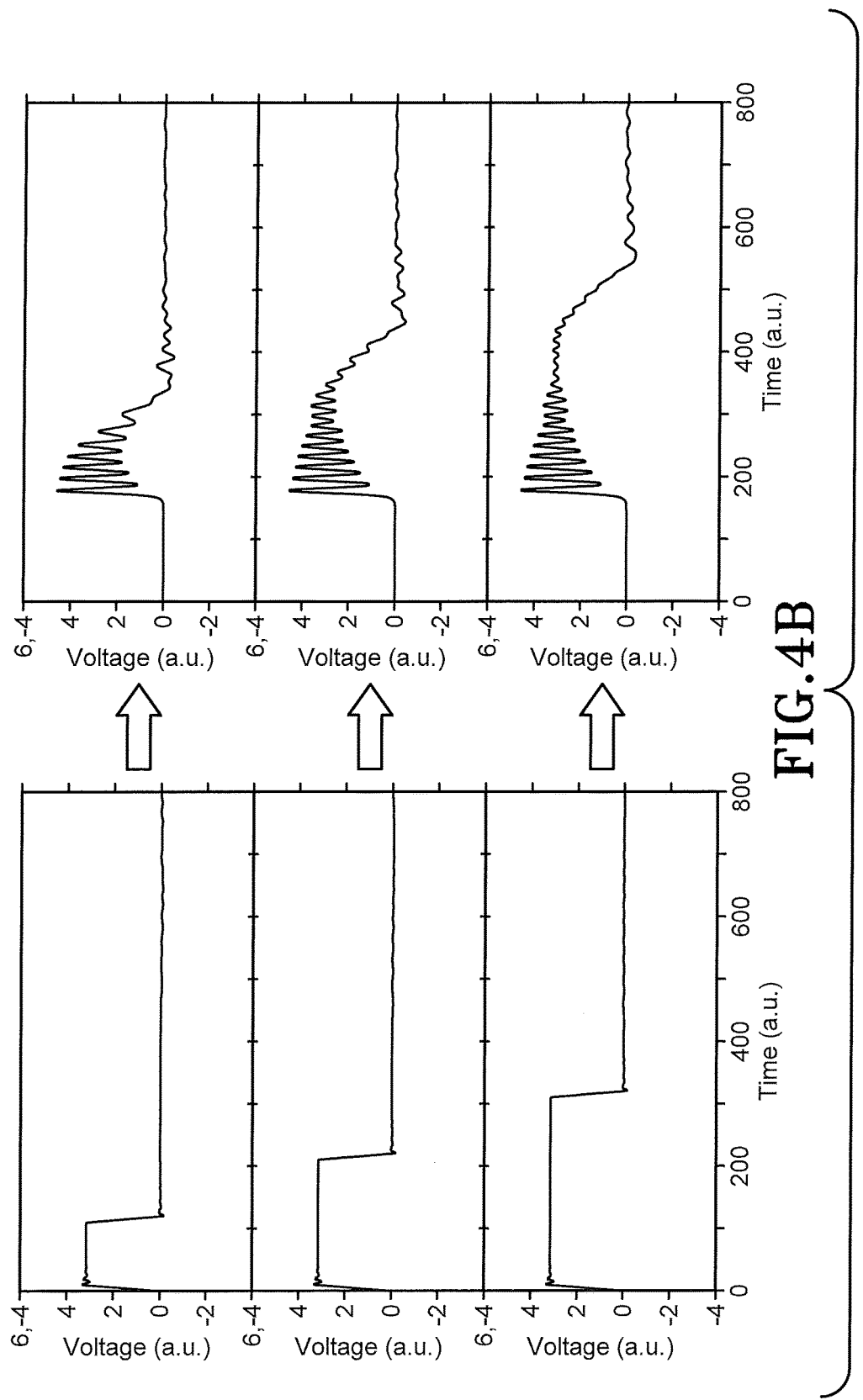
FIG. 4B are graphs representing input unipolar waveforms and output modulated waveforms of a unipolar drive pulse.

Satisfying the above parameters further allows the system 200 to have higher energy in a short period of time as shown in FIG. 4A as opposed to lower energy associated with a damped sinusoid of fixed length produced by a conventional unipolar pulse driven NLTL modulator as shown in FIG. 4B. This further allows the output RF energy of the system to increase greater than a linear increase based on the increase of input energy. Therefore, the system 200 has a higher energy conversion efficiency compared to conventional unipolar pulse driven NLTL modulators. Still further, and as shown in FIG. 4A, adjusting the bipolar frequency enables parametric resonance which results in a 4 times increase in peak output RF power compared to conventional unipolar pulse driven NLTL modulators as shown in FIG. 4B. Still further, providing a sinusoidal signal at the input of the system 200 allows the magnetic NLTLs of the system 200 to perform as very efficient frequency multipliers.

Figure 3A:
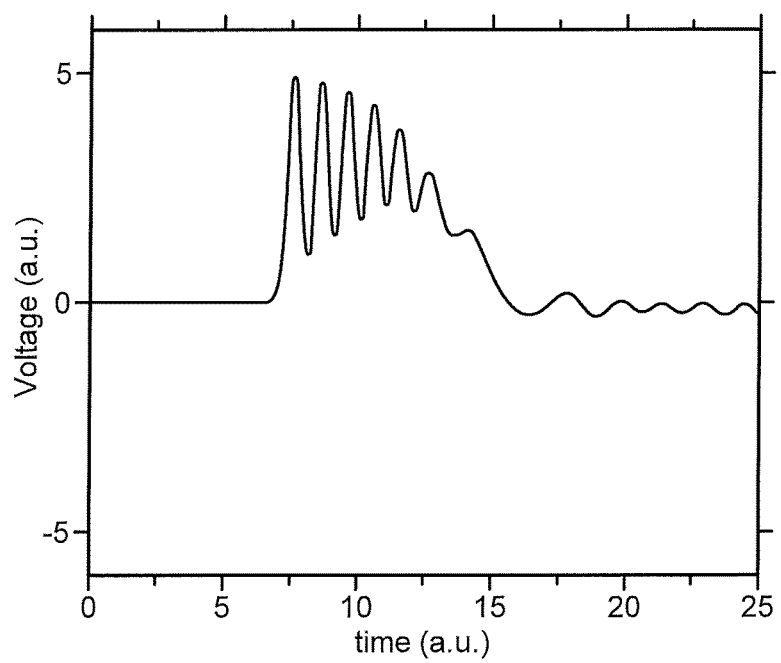
FIG. 3A is a graph showing an input waveform (i.e. a unipolar pulse) associated with a conventional NLTL system.
Figure 3B:
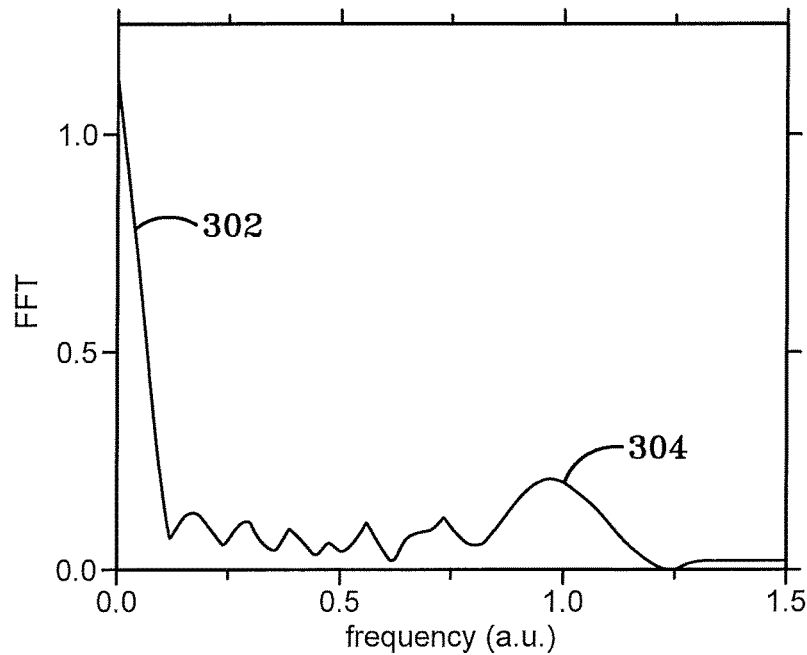
FIG. 3B is a graph showing a Fast Fourier Transform (FFT) of the generated signals associated with a conventional NLTL system.
Figure 3C:
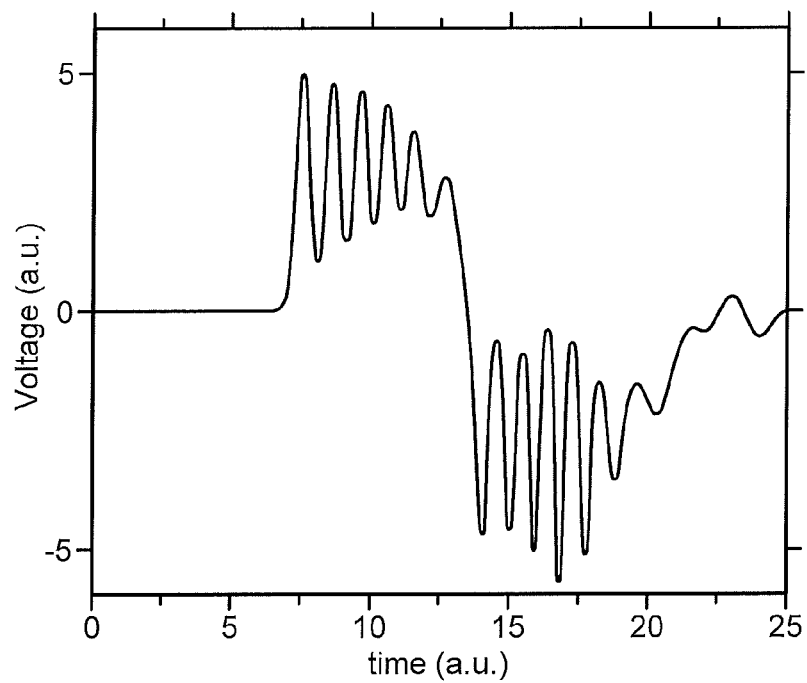
FIG. 3C is a graph showing an input waveform (i.e. a bipolar pulse) associated with a system in accordance with the present disclosure.
Figure 3D:
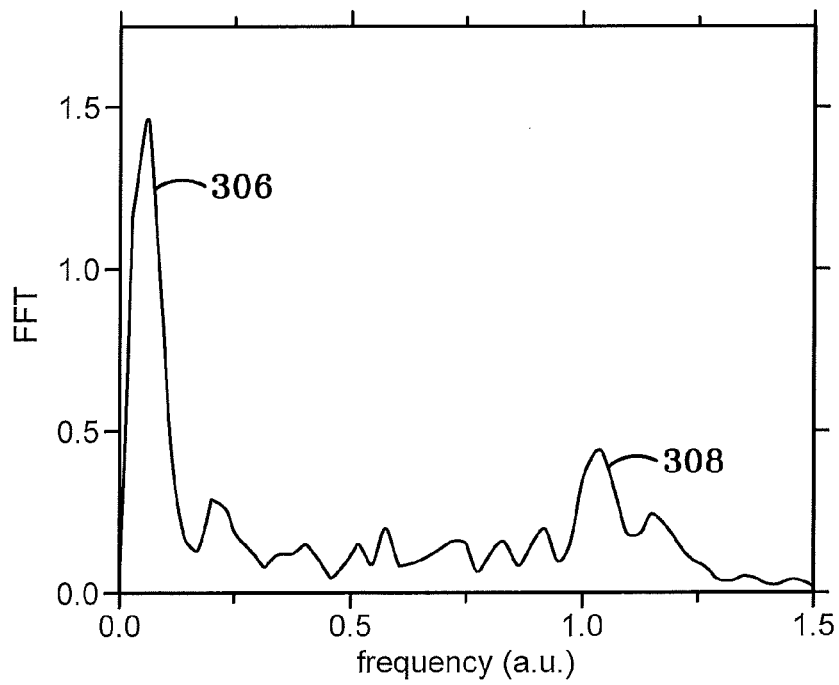
FIG. 3D is a graph showing an FFT of the generated signals associated with a system in accordance with the present disclosure.

FIG. 3A depicts a graph showing an input waveform (i.e. a unipolar pulse) associated with a conventional NLTL system. Voltage is identified along the y-axis and time is identified along the x-axis. FIG. 3B depicts a graph showing a Fast Fourier Transform (FFT) of the generated signals associated with a conventional NLTL system. FFT is identified along the y-axis and frequency is identified along the x-axis. The FFT includes a non-radiating band 302 generated by a conventional driver and a frequency band 304 generated by the conventional NLTL. FIG. 3C depicts a graph showing an input waveform (i.e. a bipolar pulse) associated with the system 200. Voltage is identified along the y-axis and time is identified along the x-axis. FIG. 3D depicts a graph showing an FFT of the generated signals associated with the system 200. FFT is identified along the y-axis and frequency is identified along the x-axis. The FFT includes a radiating band 306 generated by the photoconductive switch driver 202 and a frequency band 308 generated by the NLTL 212. When comparing FIG. 3B to FIG. 3D, the non-radiating DC component of the spectrum of the signal of FIG. 3B shifts upward and may become a high energy radiating component as shown in FIG. 3D.

Due to inherent RF losses, conventional NLTL-based sources can produce only a damped sinusoid output which limits the length of the generated RF pulse. Switching an NLTL 212 with a photoconductive switch driver 202 allows parametric amplification which compensates for RF loss. The photoconductive switch driver 202 generates oscillations with equal amplitude instead of a damped sinusoid. This allows the system 200 to generate long pulses of non-decaying oscillations as shown in FIG. 3C.

Reference is made to FIG. 4A which depicts input bipolar waveforms and output modulated waveforms in accordance with the present disclosure. If the ratio between driver frequency and modulation frequency are properly selected with a multi-cycle driver, the amplitude of oscillation can increase from cycle to cycle due to parametric amplification allowing faster than linear increase of the output RF energy with the increase of input energy. This also results in higher conversion efficiency and larger output energy in a short period of time as illustrated in FIG. 4A. The peak-to-peak amplitude of the oscillations in the second positive 414 half cycle is more than twice as large as the amplitude in the first half cycle 416, indicating a 4 times increase of the peak output power versus a conventionally driven NLTL. Contrarily, FIG. 4B demonstrates that an increase in energy in an input unipolar drive pulse does not lead to higher RF energy at the output.

Figure 5:
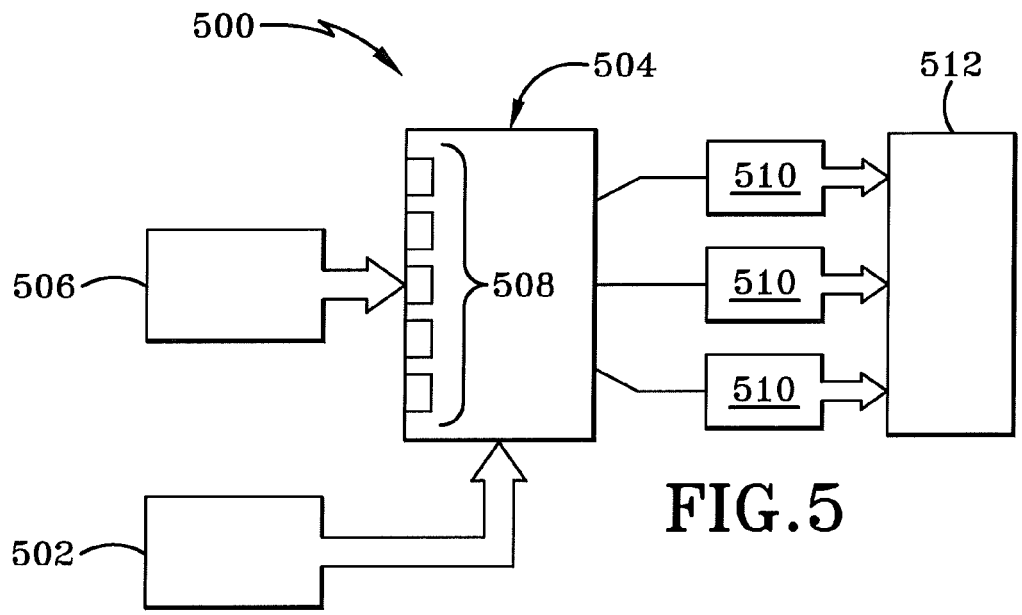
FIG. 5 is a diagrammatic top view of a system for generating high power pulses in accordance with the present disclosure.

In accordance with one embodiment of the present disclosure, and as depicted in FIG. 5, a system for generating high power RF and/or microwave pulses is broadly depicted as 500. System 500 may include a power supply 502, an array of high power pulse generators 504, a laser 506, an array of optically activated photoconductive semiconductor switches (PCSSs) 508, an array of high frequency NLTLs 510 and an antenna array 512.

With continued reference to FIG. 5, the power supply 502 is electrically connected to the array of high power pulse generators 504 through an input of one of the high power pulse generators in the array of high power pulse generators 504. Each of the high power pulse generators in the array of high power pulse generators 504 includes at least one input and at least one output. The array of high power pulse generators 504 includes an array of PCSSs 508. Each high power pulse generator is electrically coupled to one of the PCSSs in the array of PCSSs 508. Each one of the PCSSs in the array of PCSSs 508 is positioned to receive a pulse from the laser 506. Each one of the NLTLs in the array of NLTLs 510 includes at least one input and at least one output. Each one of the NLTLs is electrically connected to one of the high power pulse generators in the array of high power pulse generators 504 through the input of each NLTL in the array of NLTLs 510 and the output of each high power pulse generator in the array of high power pulse generators 504. Each antenna in the antenna array 512 includes at least one input and at least one output. Each one of the NLTLs in the array of NLTLs 510 is electrically connected to an antenna in the antenna array 512.

In one embodiment according to the present disclosure, the power supply 502 serves as a pump generator. The array of high power pulse generators 504 is activated by a laser 506 when the laser 506 triggers the array of optically activated PCSSs 508. The output of the array of high power pulse generators 504 is routed to the array of high frequency NLTLs 510. The output power of the NLTLs 510 is routed to the antenna array 512 and may be radiated through the outputs of the antennas in the antenna array 512. In this embodiment according to the present disclosure, the array of optically activated PCSSs 508 eliminates jitter from the system 500 which allows the array of NLTLs 510 to coherently radiate output RF and/or microwave power of the system 500. Further, the array of NLTLs may be synchronized to increase direct current (DC) to radio frequency (RF) conversion efficiency.

In accordance with an aspect of the present disclosure, the systems 100, 200, 500 for generating high power RF and/or microwave pulses are implemented as bipolar pulse generators having several advantages over current pulse generator systems. For example, the systems 100, 200, 500 are dual band systems in which each frequency of the systems 100, 200, 500 are independently tunable (i.e. dual-band output capability). Another advantage is that the systems 100, 200, 500 allow synchronization of high frequency output which enables arraying of sources which increases operational frequency by ten times compared to conventional photoconductive switch-based systems (i.e. the operational frequency of the systems 100, 200, 500 may be up to 11 GHz). The output frequency of the systems 100, 200, 500 is determined by the driver signal power which in turn is controlled by the charging voltage. Therefore, it is possible to generate drive signals that result in a widely tunable system 100, 200, 500 output center frequency in the range from approximately 1 GHz to 11 GHz. Further, a multi-cycle driver may be used to develop multi-frequency output or even more highly complex waveforms that could be tailored to individual target specifications.

Another advantage of the systems 100, 200, 500 is that the systems 100, 200, 500 provide a ten times increase of radiated energy in a short period of time compared to current NLTL systems. The systems 100, 200, 500 may be combined in an array which allows the systems 100, 200, 500 to radiate coherently. As systems 100, 200, 500 are added to the array, the efficiency of the radiating aperture increases. Therefore, the peak power increases as $N^2$, where N is the number of systems 100, 200 500 in the array. The array of systems 100, 200, 500 may be scaled in size to achieve any system level goals. Ten systems 100, 200, 500 in an array would be expected to generate a peak power in excess of 100 MW.

Figure 6:
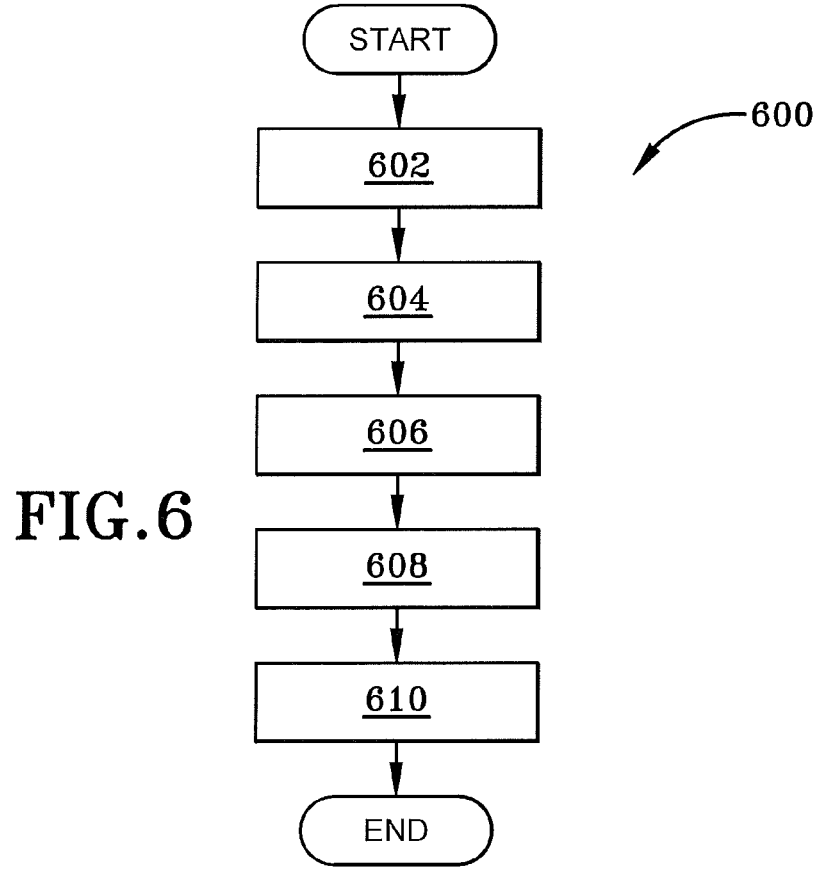
FIG. 6 is a flowchart depicting an exemplary method for high power pulse generation.

In accordance with one aspect of the present disclosure, FIG. 6 depicts a flowchart of a method 600 of generating high power pulses. The method 600 may generate high power RF and/or microwave pulses. The method 600 first triggers at least one photoconductive semiconductor switch (PCSS) with a laser, which is shown generally at 602. The method 600 activates at least one bipolar pulse generator when the at least one PCSS is triggered, which is shown generally at 604. The method 600 generates a bipolar pulse by the bipolar pulse generator, which is shown generally at 606. This waveform may be one cycle long or may be many cycles long with each cycle being similar or having different periods and/or areas with a voltage envelope. The method 600 modulates the bipolar pulse by a modulator unit with an oscillating pulse, which is shown generally at 608. The spectrum of the modulated signal contains very little to no DC components. The method 600 may transmit the modulated signal to at least one antenna, which is shown generally at 610.

An embodiment is an implementation or example of the present disclosure. Reference in the specification to "an embodiment," "one embodiment," "some embodiments," "one particular embodiment," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A system for generating bipolar pulses, the system comprising:
   a photoconductive semiconductor switch (PCSS);
   a laser for triggering the PCSS;
   a bipolar pulse generator coupled to the PCSS, wherein the bipolar pulse generator is activated when the PCSS is triggered;
   a bipolar pulse generated by the activated bipolar pulse generator;
   a pulsed magnetic field, wherein periodic variation of a polarity of the pulsed magnetic field provides parametric amplification oscillation; and
   a modulator unit that modulates the bipolar pulse to create a modulated bipolar pulse, wherein the modulator unit is a nonlinear transmission line (NLTL).

2. The system of claim 1, wherein the operating frequency range of the system is between approximately 1 gigahertz and 11 gigahertz.

3. The system of claim 1, wherein the NLTL modulates the bipolar pulse with oscillating pulses to generate the modulated bipolar pulse, and wherein the modulated bipolar pulse includes oscillating pulses.

4. The system of claim 1, further comprising:
   a relaxation time of a precession of the NLTL; and
   a bipolar pulse length that is less than the relaxation time.

5. The system of claim 1, wherein the bipolar pulse generated by the generator is a sinusoidal pulse.

6. The system of claim 1, wherein the bipolar pulse generator is a single-cycle generator.

7. The system of claim 1, wherein the bipolar pulse generator is a multi-cycle generator.

8. The system of claim 1, wherein a frequency of the bipolar pulse is adjusted to enable parametric resonance.

9. The system of claim 1, wherein the PCSS is a silicon PiN photodiode operating in a linear mode.

10. The system of claim 1, wherein the bipolar pulse generator is a photoconductive switch driver.

11. The system of claim 10, further comprising:
    potting material to secure the photoconductive switch driver;
    a cradle to secure the potting material and the photoconductive switch driver;
    a thin-film transmission line;
    an active transformer, wherein the thin-film transmission line and the active transformer couple a low impedance at the photoconductive switch driver with an input impedance of the NLTL; and
    a passive transformer to match an output impedance of the NLTL with the input impedance of the NLTL.

12. The system of claim 11, wherein the transmission line and the active transformer incorporate a geometry that couples the low impedance at the photoconductive switch driver with the input impedance of the NLTL.

13. The system of claim 12, wherein the NLTL is a coaxial NLTL including a ferrite material.

14. The system of claim 1 in combination with a plurality of identical systems, wherein the plurality of identical systems are arranged in an array.

15. The combination of claim 13, wherein the plurality of identical systems in the array are synchronized to increase direct current (DC) to radio frequency (RF) conversion efficiency.

16. The combination of claim 14, wherein the bipolar pulse generators of the plurality of identical systems are multi-cycle generators, and wherein a frequency of the bipolar pulse is adjusted to enable parametric resonance.

17. A method for generating high power pulses comprising:
    triggering at least one photoconductive semiconductor switch (PCSS) with a laser;
    activating at least one bipolar pulse generator when the at least one PCSS is triggered;
    generating at least one bipolar pulse by the at least one activated bipolar pulse generator;
    modulating the at least one bipolar pulse by at least one modulator unit with an oscillating pulse, wherein the at least one modulator unit is a nonlinear transmission line (NLTL); and
    adjusting the bipolar pulse to enable parametric resonance, wherein the bipolar pulse generator is a multi-cycle generator.

18. The method for generating high power pulses of claim 17, wherein a length of each bipolar pulse is less than a relaxation time of a precession of the NLTL.

* * * * *